(12) United States Patent
Ahmadi et al.

(10) Patent No.: US 10,306,543 B2
(45) Date of Patent: *May 28, 2019

(54) BASE STATION DISCOVERY AND ASSOCIATION IN CELLULAR NETWORKS

(71) Applicant: Intel Corporation, Santa Clara, CA (US)

(72) Inventors: Sassan Ahmadi, Portland, OR (US); Shahrnaz Azizi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/992,523

(22) Filed: Jan. 11, 2016

(65) Prior Publication Data
US 2016/0174143 A1 Jun. 16, 2016

Related U.S. Application Data

(63) Continuation of application No. 13/769,703, filed on Feb. 18, 2013, now Pat. No. 9,237,435, which is a continuation of application No. 12/646,560, filed on Dec. 23, 2009, now Pat. No. 8,400,985.

(51) Int. Cl.
| | |
|---|---|
| *H04W 8/00* | (2009.01) |
| *H04W 16/32* | (2009.01) |
| *H04W 36/24* | (2009.01) |
| *H04W 48/16* | (2009.01) |
| *H04W 48/20* | (2009.01) |

(52) U.S. Cl.
CPC ........... *H04W 48/16* (2013.01); *H04W 8/005* (2013.01); *H04W 16/32* (2013.01); *H04W 36/24* (2013.01); *H04W 48/20* (2013.01)

(58) Field of Classification Search
CPC ..... H04W 8/005; H04W 16/24; H04W 16/32; H04W 36/0083; H04W 36/24; H04W 36/30; H04W 36/34; H04W 36/36; H04W 40/12; H04W 40/24; H04W 40/246; H04W 48/10; H04W 48/16; H04W 48/20; H04W 84/02; H04W 84/12
See application file for complete search history.

(56) References Cited

U.S. PATENT DOCUMENTS

| | | | |
|---|---|---|---|
| 8,072,953 B2 * | 12/2011 | Mukherjee | H04L 63/104 370/338 |
| 8,121,089 B2 | 2/2012 | Bao et al. | |
| 8,259,666 B2 | 9/2012 | Bao et al. | |

(Continued)

OTHER PUBLICATIONS

"U.S. Appl. No. 12/646,560, Examiner Interview Summary dated Jun. 19, 2012", 2 pgs.

(Continued)

*Primary Examiner* — Alpus Hsu
(74) *Attorney, Agent, or Firm* — Schwegman Lundberg & Woessner, P.A.

(57) ABSTRACT

Embodiments of a method and apparatus for discovery and association, by a mobile station, of a femto base station from a plurality of base stations. The mobile station may select a base station for consideration for association by decoding a physical layer identifier to determine that the base station is a macro base station and select a different base station based on other considerations. Other embodiments may be described and claimed.

12 Claims, 4 Drawing Sheets

(56) References Cited

U.S. PATENT DOCUMENTS

| | | | |
|---|---|---|---|
| 8,265,033 B2 | 9/2012 | Gunnarsson et al. | |
| 8,310,946 B2 * | 11/2012 | Somasundaram | H04J 11/0093 370/252 |
| 8,391,871 B2 * | 3/2013 | Wu | H04W 36/0061 370/331 |
| 8,400,985 B2 | 3/2013 | Ahmadi et al. | |
| 8,433,317 B2 * | 4/2013 | Wu | H04W 8/18 370/338 |
| 8,509,785 B2 * | 8/2013 | Nylander | H04J 11/0069 455/438 |
| 8,520,617 B2 | 8/2013 | Krishnamurthy et al. | |
| 8,588,773 B2 * | 11/2013 | Deshpande | H04J 11/0093 370/328 |
| 8,626,155 B2 * | 1/2014 | Rune | H04L 63/101 370/328 |
| 8,630,642 B2 * | 1/2014 | Wu | H04W 12/08 455/435.2 |
| 8,630,650 B2 | 1/2014 | Lee | |
| 8,634,360 B2 | 1/2014 | Liu et al. | |
| 8,634,836 B2 * | 1/2014 | Pani | H04W 24/10 370/331 |
| 8,654,750 B2 * | 2/2014 | Wang | H04L 63/104 370/338 |
| 8,660,089 B2 * | 2/2014 | Huang | H04W 48/20 370/328 |
| 8,666,410 B2 * | 3/2014 | Wu | H04J 11/0093 370/340 |
| 8,666,411 B2 | 3/2014 | Tokgoz et al. | |
| 8,682,299 B2 * | 3/2014 | Jung | H04W 4/08 455/414.1 |
| 8,711,767 B2 | 4/2014 | Balasubramanian et al. | |
| 8,761,753 B2 | 6/2014 | Meshkati et al. | |
| 8,768,398 B2 | 7/2014 | Meshkati et al. | |
| 8,774,852 B2 | 7/2014 | Meshkati et al. | |
| 8,787,306 B2 | 7/2014 | Balasubramanian et al. | |
| 8,792,886 B2 | 7/2014 | Meshkati et al. | |
| 8,805,288 B2 * | 8/2014 | Martin | H04B 17/0067 455/63.1 |
| 8,811,947 B2 | 8/2014 | Venkatachalam et al. | |
| 8,811,986 B2 | 8/2014 | Venkatachalam et al. | |
| 8,843,129 B2 * | 9/2014 | Li | H04W 36/0061 455/434 |
| 8,862,099 B2 * | 10/2014 | Rune | H04W 48/16 370/328 |
| 8,934,910 B2 | 1/2015 | Lee et al. | |
| 8,989,086 B2 | 3/2015 | Li et al. | |
| 8,995,998 B2 * | 3/2015 | Singh | H04W 48/12 455/435.1 |
| 9,042,883 B2 * | 5/2015 | Wang | H04J 11/0093 455/432.1 |
| 9,042,899 B2 * | 5/2015 | Dalsgaard | H04J 11/0069 455/443 |
| 9,237,435 B2 | 1/2016 | Ahmadi et al. | |
| 2009/0052395 A1 | 2/2009 | Bao et al. | |
| 2009/0052418 A1 | 2/2009 | Semper | |
| 2009/0129263 A1 | 5/2009 | Osborn | |
| 2009/0221287 A1 | 9/2009 | Balasubramanian et al. | |
| 2009/0238114 A1 | 9/2009 | Deshpande et al. | |
| 2009/0247157 A1 | 10/2009 | Yoon et al. | |
| 2009/0247170 A1 | 10/2009 | Balasubramanian et al. | |
| 2009/0305699 A1 | 12/2009 | Deshpande et al. | |
| 2010/0027510 A1 | 2/2010 | Balasubramanian et al. | |
| 2010/0048217 A1 | 2/2010 | Deshpande et al. | |
| 2010/0067443 A1 | 3/2010 | Luo et al. | |
| 2010/0067514 A1 | 3/2010 | Luo et al. | |
| 2010/0069069 A1 * | 3/2010 | Lee | H04W 48/16 455/435.2 |
| 2010/0111047 A1 | 5/2010 | Yang et al. | |
| 2010/0112980 A1 * | 5/2010 | Horn | H04W 48/20 455/411 |
| 2010/0112981 A1 * | 5/2010 | Suh | H04W 48/14 455/411 |
| 2010/0120394 A1 | 5/2010 | Mia et al. | |
| 2010/0120447 A1 | 5/2010 | Anderson et al. | |
| 2010/0157906 A1 | 6/2010 | Yang et al. | |
| 2010/0203866 A1 * | 8/2010 | Li | H04L 1/0045 455/411 |
| 2010/0240365 A1 | 9/2010 | Chen | |
| 2010/0278141 A1 | 11/2010 | Choi-grogan et al. | |
| 2010/0330993 A1 | 12/2010 | Kone | |
| 2011/0007690 A1 | 1/2011 | Chang et al. | |
| 2011/0070867 A1 * | 3/2011 | Venkatachalam | H04W 48/02 455/411 |
| 2011/0111745 A1 | 5/2011 | Li et al. | |
| 2011/0128916 A1 | 6/2011 | Kwon et al. | |
| 2011/0149878 A1 | 6/2011 | Ahmadi et al. | |
| 2011/0151859 A1 * | 6/2011 | Lee | H04W 48/02 455/422.1 |
| 2011/0212729 A1 * | 9/2011 | Li | H04W 48/16 455/450 |
| 2011/0274051 A1 * | 11/2011 | Vikberg | H04L 63/101 370/328 |
| 2011/0287787 A1 | 11/2011 | Nagaraja et al. | |
| 2011/0294493 A1 | 12/2011 | Nagaraja et al. | |
| 2013/0157657 A1 | 6/2013 | Ahmadi et al. | |

OTHER PUBLICATIONS

"U.S. Appl. No. 12/646,560, Final Office Action dated Jul. 25, 2012", 5 pgs.

"U.S. Appl. No. 12/646,560, Non Final Office Action dated Mar. 14, 2012", 9 pgs.

"U.S. Appl. No. 12/646,560, Notice of Allowance dated Nov. 13, 2012", 6 pgs.

"U.S. Appl. No. 12/646,560, Response filed Jun. 19, 2012 to Non Final Office Action dated Mar. 14, 2012", 13 pgs.

"U.S. Appl. No. 12/646,560, Response filed Jul. 16, 2012 to Non Final Office Action dated Mar. 14, 2012", 14 pgs.

"U.S. Appl. No. 12/646,560, Response filed Oct. 22, 2012 to Final Office Action dated Jul. 25, 2012", 8 pgs.

"U.S. Appl. No. 12/846,560, Restriction Requirements dated Jan. 30, 2012", 5 pgs.

"U.S. Appl. No. 13/769,703, Examiner Interview Summary dated Jun. 8, 2015", 3 pgs.

"U.S. Appl. No. 13/769,703, Final Office Action dated Jun. 18, 2015", 5 pgs.

"U.S. Appl. No. 13/769,703, Non Final Office Action dated May 6, 2015", 14 pgs.

"U.S. Appl. No. 13/769,703, Notice of Allowance dated Sep. 8, 2015", 7 pgs.

"U.S. Appl. No. 13/769,703, Preliminary Amendment filed May 10, 2013", 8 pgs.

"U.S. Appl. No. 13/769,703, Response filed Apr. 13, 2015 to Restriction Requirement dated Feb. 20, 2015", 9 pgs.

"U.S. Appl. No. 13/769,703, Response filed Jun. 3, 2015 to Non Final Office Action dated May 6, 2015", 11 pgs.

"U.S. Appl. No. 13/769,703, Response filed Aug. 13, 2015 to Final Office Action dated Jun. 18, 2015", 8 pgs.

"U.S. Appl. No. 13/769,703, Restriction Requirement dated Feb. 20, 2015". 5 pgs.

* cited by examiner

US 10,306,543 B2

BASE STATION DISCOVERY AND ASSOCIATION IN CELLULAR NETWORKS

PRIORITY APPLICATION

This application is a continuation of U.S. patent application Ser. No. 13/769,703, filed Feb. 18, 2013, which is a continuation of U.S. patent application Ser. No. 12/646,560, filed Dec. 23, 2009, now issued as U.S. Pat. No. 8,400,985, each of which are incorporated herein by reference in their entirety.

TECHNICAL FIELD

Various embodiments described herein relate to apparatus, systems, and methods associated with wireless communication, including mobile station discovery techniques. Some embodiments relate to broadband wireless access networks that operate in accordance with one of the IEEE 802.16 standards.

BACKGROUND

Femto access points or alternatively femto base stations (femto BS) are lower-power, lower-cost, lower complexity cellular network base stations that may be installed by the user at home or small office environments for indoor coverage improvements and are typically connected through broadband connections such as cable modem to the operator's core network.

Since the femto base stations are (or will be) densely deployed, use of the typical cell search and cell selection methods, which are used for initial network entry/re-entry or handover for macro base stations in cellular networks, would be cumbersome and would result in extreme overhead in system operation and mobile station (MS) complexity and excessive power consumption. Furthermore, private femto base stations may be overloaded with signaling with unauthorized mobile stations trying to select them as target base stations for handover or system entry/re-entry.

Thus a need exists for an efficient method for femtocell discovery and association that would reduce the complexity and time of cell search and cell selection by mobile stations and thereby results in lower MS power consumption as well as helping to ensure that private femto base stations will not have to exchange signals and messages with unauthorized mobile stations thereby improving their performance.

DETAILED DESCRIPTION

The following description and the drawings sufficiently illustrate specific embodiments to enable those skilled in the an to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
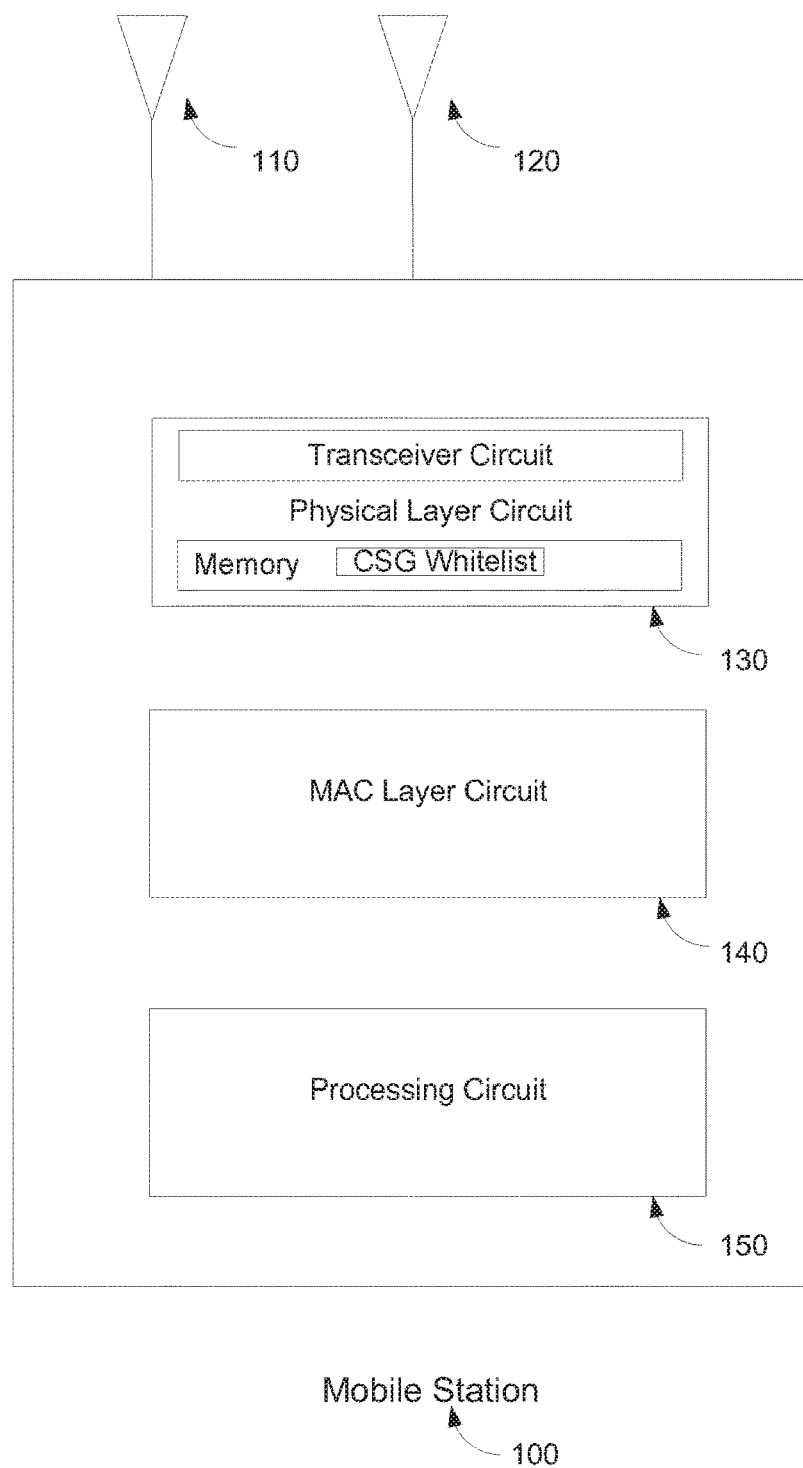
FIG. 1 is a block diagram of a mobile station according to various embodiments.

FIG. 1 is a block diagram of a mobile station 100 including multiple antennas 110 and 120, a physical layer circuit 130, a media access control (MAC) layer circuit 140 and a processing circuit 150.

Antennas 110 and 120 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some MIMO (multiple input multiple output) embodiments, antennas 110 and 120 may be effectively separated to take advantage of spatial diversity and the different channel characteristics that may result between each of antennas 110 and 120 and the antennas of a transmitting station. In some MIMO embodiments, antennas 110 and 120 may be separated by up to $^{1}\!/_{10}$ of a wavelength or more.

In some embodiments, mobile station 100 may be configured to receive orthogonal frequency division multiplexing (OFDM) communication signals over a multicarrier communication channel. The OFDM signals may comprise a plurality of orthogonal subcarriers. In some of these multicarrier embodiments, mobile station 100 may be part of a wireless local area network (WLAN) communication station such as a wireless access point (AP) or base station. Mobile station 100 may be configured to communicate in accordance with an orthogonal frequency division multiple access (OFDMA) technique.

In some embodiments, receiver 100 may be configured to receive signals in accordance with IEEE 802.16 standards for wireless area networks. In some embodiments, physical layer circuit 130 is configured to handle physical layer communications, MAC layer circuit 140 is configured to handle MAC layer communications and processing circuit 150 is configured to handle higher level processing. For more information with respect to IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999."

Figure 2:
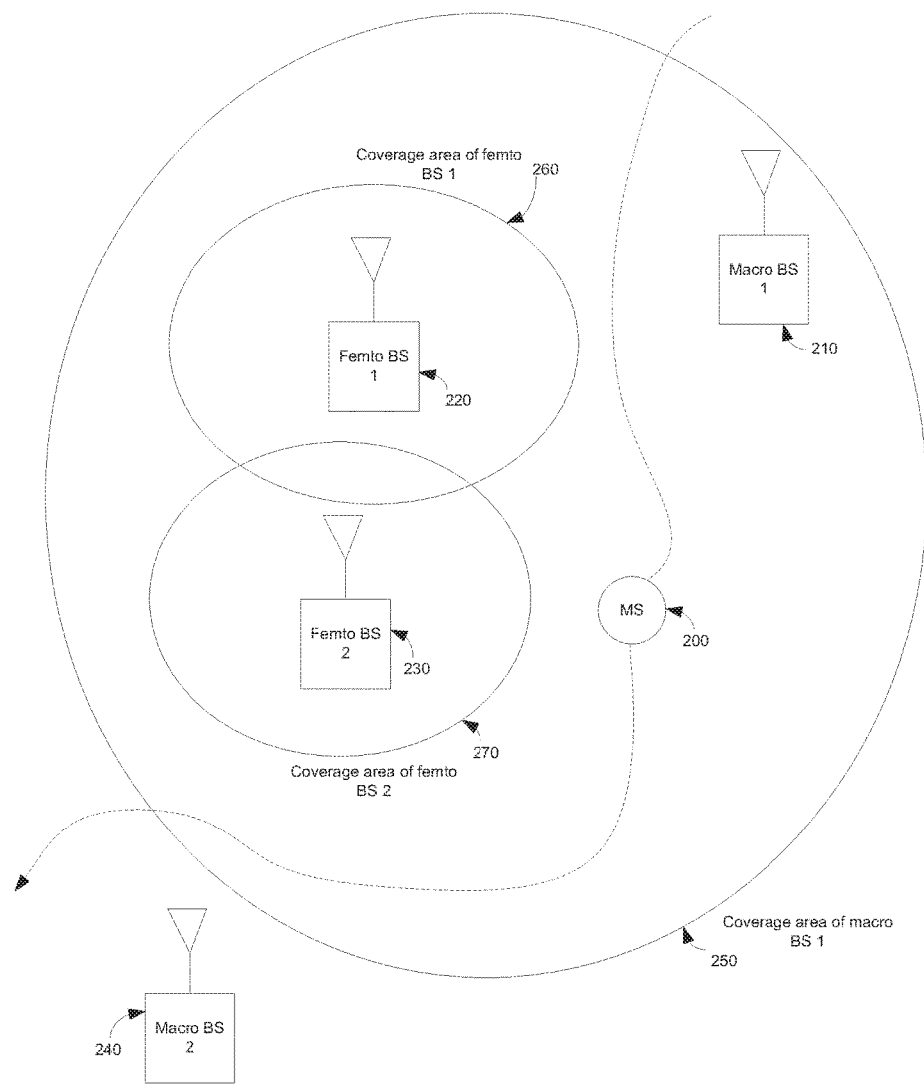
FIG. 2 is a positional diagram of typical base stations and a mobile station in a wireless packet-carrying network according to various embodiments.

FIG. 2 is a positional diagram of typical base stations, including Macro base stations 210 and 240, and Femto base stations 220 and 230 in a wireless packet-carrying network according to various embodiments. Mobile station 200 is shown roaming through Macro base station 210 coverage area 250. Femto base station coverage areas 260 and 270 are also depicted. Mobile station 200 may be handed over to or from a Macro base station 240 or Femto base station 220 or 230.

Femto access points or alternatively femto base stations (femto BS) 220, 230 are lower-power, lower-cost, lower complexity base stations that may be installed by the user at home or small office environments for indoor coverage improvements and may be connected through broadband connections such as cable modem to the operator's core network.

Femto BS 220 operates in licensed spectrum and is operated by the cellular network operators. They are plug-and-play devices that once connected to the operator's core network are automatically configured and are self-optimized and self-organized while in operation. Femto BS 220 has limited coverage and is typically used as an overlay with the macro BS 210 (Although it may operate in remote and non-overlay cases, as well). The femto BS 220 and macro BS 210 may operate on the same or different Frequency Assignment (FA) or frequency layer or frequency band. Femto BS 220 may belong to an open (accessible to all subscribers) or closed (accessible to authorized subscribers) subscriber groups.

Since the femto base stations 220 are (or will be) densely deployed, use of the typical cell search and cell selection methods, which are used for initial network entry/re-entry or handover for macro base stations 210 in cellular networks, would be cumbersome and would result in extreme overhead in system operation and Mobile Station (MS) 200 complexity and excessive power consumption. Furthermore, private Femto base 210 stations may be overloaded with signaling with unauthorized mobile stations trying to select them as target base stations for handover or system entry/re-entry.

In some embodiments, an efficient method for femtocell discovery and association that may reduce the complexity and time of cell search and cell selection by MS 200 is provided. These embodiments may result in lower MS 200 power consumption as well as ensuring the private Femto base stations 220 will not have to exchange signals and messages with unauthorized mobile stations thereby improving their performance.

The Femto base stations 220 may either belong to Closed Subscriber Groups (CSG) or Open Subscriber Groups (OSG). In CSG, the access and services are restricted to authorized mobile stations. The credentials or electronic certificates may be provided to the mobile station 200 by the cellular system operator at the time of subscription. The serving Macro BS 210 may have the knowledge (through MS context generated following session setup) of the CSGs where the MS 200 may have access.

The OSGs, on the other hand, are publicly accessible and no specific subscription is required. The MS may still have to be authenticated by the operator's network.

During normal operation and as part of handover, the MS 200 may measure the received RF signal strength from the serving and the neighboring base stations 210, 220, 230 and 240 and selects the most viable candidate base stations as target for handover. The measurements may be conducted on the synchronization sequences that are unique to each base station and further carry the Cell Identification (Cell_ID) or Physical Layer (PHY) level identifier. The type of the cell may also be communicated via the synchronization sequences if a hierarchical synchronization scheme is utilized. Since the number of bits that can be carried through the synchronization sequences are limited, additional information on the cell type and other configuration restrictions are broadcasted as part of system configuration information. In some IEEE 802.16m embodiments, there are two stages of Downlink (DL) synchronization. The DL synchronization is achieved by successful acquisition of the primary advanced preamble. The primary advanced preamble carries information about base station type (e.g., macro BS or femto BS), system bandwidth (e.g., 5, 10, 20 MHz) and multi-carrier configuration (i.e., fully configured or partially configured RF carrier). Once the primary advanced preamble is detected, the MS 200 proceeds to acquisition of the secondary advanced preambles. The secondary advanced preamble carries a set of 768 distinct Cell_IDs that have been partitioned into a number of subsets where each subset corresponds to a certain type of base station (e.g., closed/open subscriber group femto base stations or macro base stations).

In some embodiments, the MS 200 may acquire the synchronization sequences, to detect the Cell_ID, followed by detection of the broadcast channel to complete the cell selection. If the MS 200 realizes that the cell is a non-accessible Femto BS or access node, it has to restart the cell search and to select another cell. This effort would prolong the initial network entry/re-entry and handover and may involve a great number of unsuccessful trials.

Upon successful acquisition of system timing and cell identification, the MS 200 may attempt to detect and decode the system configuration information. This information is carried via the Superframe Headers (SFH) in some IEEE 802.16m embodiments. The superframe headers, comprising Primary and Secondary Superframe Headers (P-SFH and S-SFH), are control elements that are periodically (while a large part of this information remains unchanged over a long period of time, some parts may change more frequently) broadcasted using a robust and reliable transmission format to ensure the information can be correctly detected by all mobile stations in the coverage area of a base station. The correct and timely detection of the system information is essential for successful network entry/re-entry and handover. The S-SFH content is divided into three sub-packets (SP1, SP2, and SP3) where sub-packets carry essential information for various system processes such as initial network entry, network re-entry, Idle-State operation, etc. according to their respective timing sensitivity. In some IEEE 802.16m embodiments, the BS Identifier (BS-ID) may be a 48 bit MAC level identifier that is used to identify the BS and is carried through S-SFH SP1 which carries the 12 Least Significant Bits (LSBs) of BS-ID and S-SFH SP2 which carries the 36 Most Significant Bits (MSBs) of the BS-ID.

Once the system parameters are successfully acquired, the cell selection can be made taking certain considerations into account. For example, the mobile station 200 may have a preference in selecting a specific type of the base station (e.g., a femtocell in indoor environment) even though other types of the base station may be available or the MS 200 may not be authorized to access a group of base stations despite the fact that their received RF signal strength might be good.

Access State is a state where the mobile station 200 performs network entry to the selected base station. In some IEEE 802.16m embodiments, the Access State may comprise the following procedures: 1) Initial ranging and uplink synchronization, 2) Basic capability negotiation, 3) Authentication, authorization, and key exchange, and 4) Registration with the BS. The mobile station 200 receives specific user identification as part of Access State procedures. The IP address assignment may follow using appropriate procedures.

The Femto base stations belonging to an operator's network may uniquely operate in a different frequency assignment (FA). That is Macro BS 240 and Femto BS 230 may be distinguished via the frequency band in which they are operating.

Figure 3:
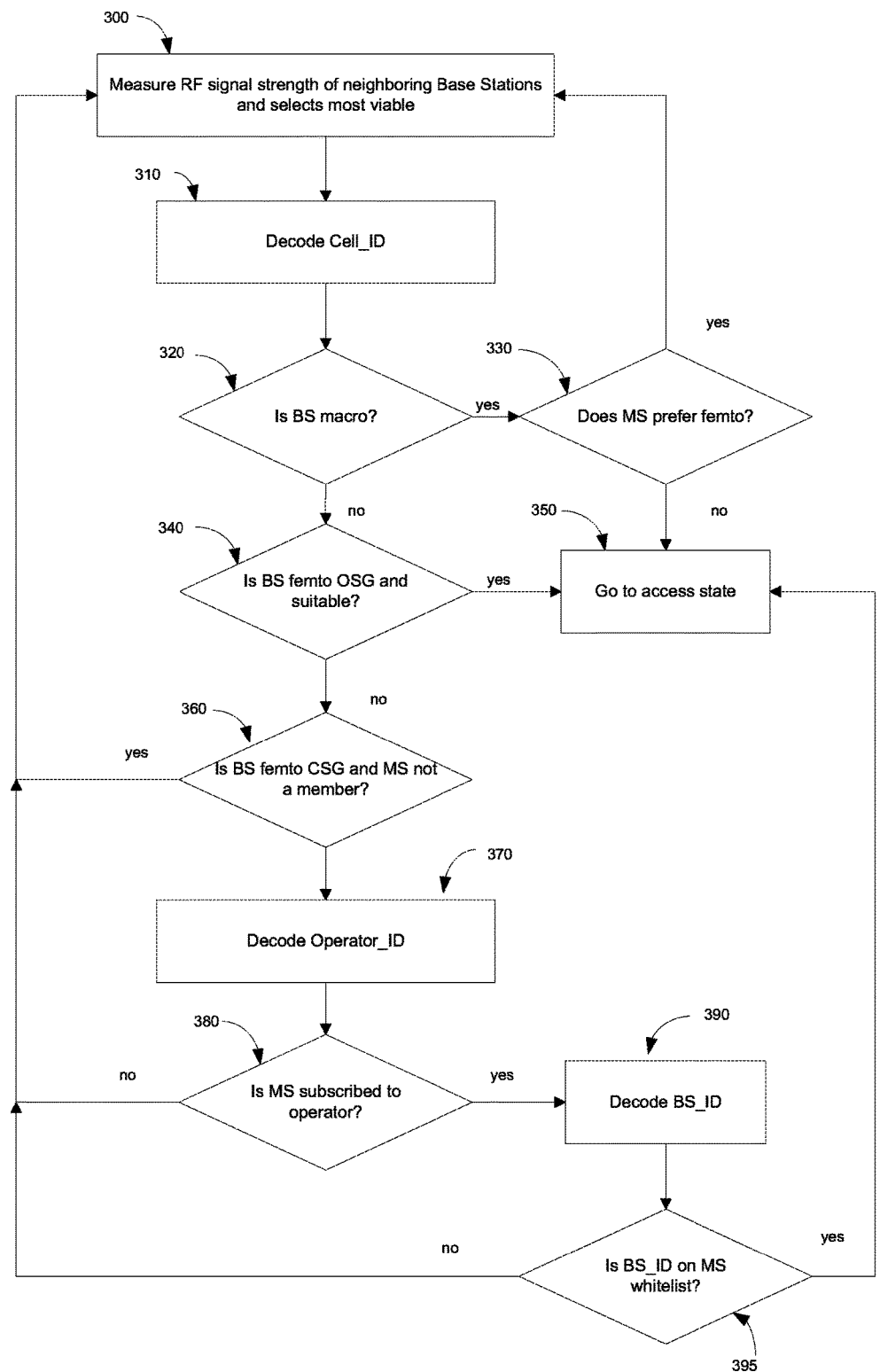
FIG. 3 is a flow diagram of a discovery according to various embodiments.

FIG. 3 is a flow diagram of a mobile station discovery according to various embodiments.

Referring now to FIG. 3, The MS begins scanning of the neighbor base stations through RF measurements, at block 300. The detection of the Cell_ID helps categorizing the BS type, at block 310, and depending on the preference of the MS, a Macro or Femto candidate is selected at blocks 320 and 340. Failure in any stage of the cell search and cell selection will result in repeating the scanning and DL synchronization at blocks 330 and 360. The Operator-ID (i.e., the 24 Most Significant Bits of BS-ID) and LSB of the BS-ID will help the MS to determine whether it is authorized to access to the target BS, at blocks 370 and 380. The BS-ID refers to the full or part of the 48-bit BS-ID which can be internally mapped to certain human-understandable characters/names such as "HOME" or "OFFICE", etc. The MS shall be subscribed to the operator identified by the Operator-ID and shall have the full or partial BS-ID in its White List (i.e., a local table in the MS containing the identities of all the CSG Femto base stations to which the MS is subscribed and is authorized to access), blocks 390 and 395. Success from blocks 330, 340 or 395 results in selection of the base station and entering access state, block 350. In some embodiments, part of the BS-ID or a derivation of it may used as a common identifier for the CSGs and may be included in the White List.

If the Femto base stations are deployed in a different FA (inter-FA), the same algorithm shall be applicable except that the MS scans a different frequency band and conducts RE measurements during scanning in that frequency. The other procedures remain intact and the detected Cell_IDs will only belong to open and/or closed subscriber group Femto base stations.

If the Femto and Macro base stations are deployed in the same FA (intra-FA), the same algorithm shall be applicable and the MS conducts RF measurements during scanning in the same frequency. Combination of the inter-FA and intra-FA scanning is also possible where the neighbor Macro base stations operate in the same frequency band and Femto base stations operate in a different frequency band(s).

Note that there is no uplink transmission during execution of this algorithm and all signals and identifiers are received and decoded via DL transmissions that will happen regardless of the MS scanning. Therefore, no additional signaling overhead will be imposed to the target Femto base stations.

The MS may or may not be Femto-Aware (i.e., can distinguish femto BS or Macro BS). If the MS is not Femto-Aware or is using an older version of air-interface protocols, the legacy network entry or re-entry or handover procedures shall be utilized.

Figure 4:
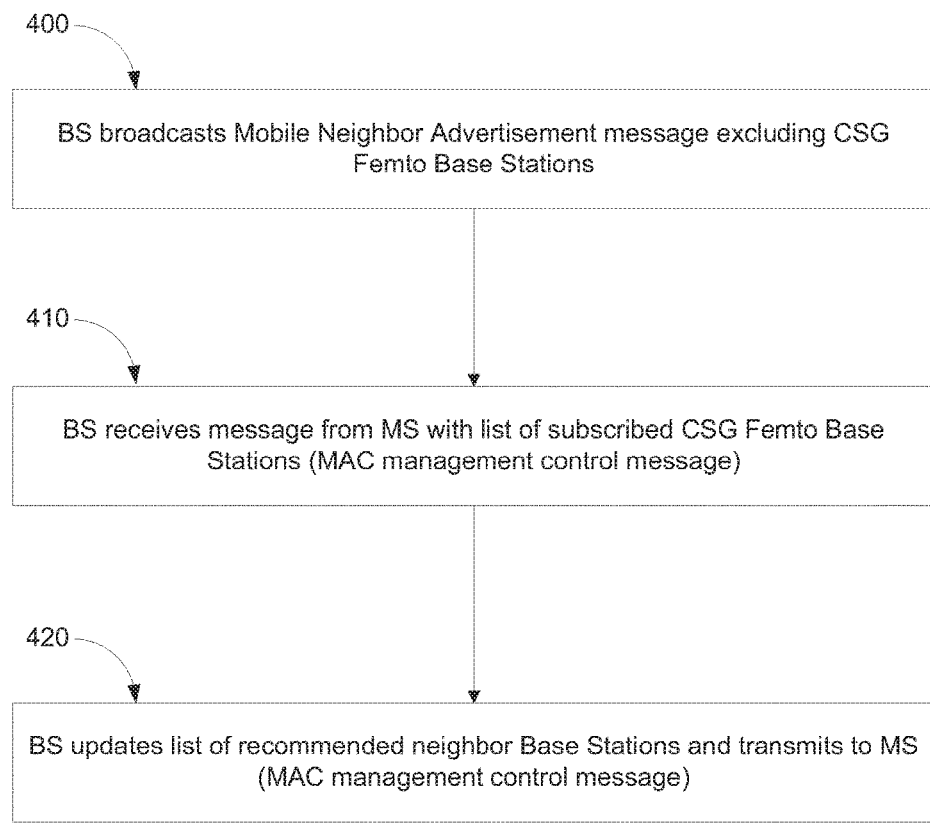
FIG. 4 is a flow diagram of a handover according to various embodiments.

FIG. 4 is a flow diagram of a mobile station handover according to various embodiments.

Referring now to FIG. 4, The serving BS broadcasts mobile neighbor advertisement (MOB_NBR-ADV or AAI_NBR-ADV) management message at a periodic interval to identify the network and define the characteristics of neighbor BS to potential MS seeking initial network entry or HO, block 400. The advanced air-interface (AAI) prefix refers to IEEE 802.16m MAC management messages. Since the femto base stations that belong to closed subscription groups are not accessible to all mobile stations in the cell and considering the broadcast nature of the MOB_NBR-ADV or AAI_NBR-ADV message, the Macro BS may refrain from broadcasting the information of CSG Femto base stations, block 400. This helps reduce the size of the MOB_NBR-ADV or AAI_NBR-ADV message.

The scanning interval is defined as the time during which the MS scans for available base stations. The mobile scanning interval request (MOB_SCN-REQ or AAI_SCN-REQ) management/control message sent by the MS in the Connected State contains a group of neighbor base stations for which scanning and association are requested. This message shall include the identity (full or partial BS-ID) of the CSG Femto base stations to which the MS is subscribed (if the MS is a Femto Preferred meaning it prefers to be associated with a Femto BS even though Macro stations may be available in its neighborhood), block 410. Note that this is a unicast MAC management message based on which the serving BS may update the MS context to reflect the CSG Femto BS list that the MS may belong to.

Upon reception of MOB_SCN-REQ or AAI_SCN-REQ message by the serving BS, the BS responds with mobile scanning interval response (MOB_SCN-RSP or AAI_SCN-RSP) management/control message granting or refusing the MS scanning interval request or a different interval and further contains the list of recommended neighbor base stations by the serving BS, at block 420.

Following receipt of the MOB_SCN-RSP or AAI_SCN-RSP MAC management/control message granting the request, the MS scans for one or more neighbor base stations and may attempt to select the cell and associate with that cell through completion of the Access State procedures. The MS may scan all the recommended neighbor base stations identified in MOB_SCN-RSP or AAI_SCN-RSP MAC management/control message and sends a report to the serving BS at the end of the scanning interval via mobile scanning interval report (MOB_SCN-REP or AAI_SCN-REP) MAC management/control message The above process/procedure can be applied to a Femto-Aware mobile station. For a legacy terminal or a Femto-Unaware mobile station, the cell search and cell selection procedures may be in accordance with those specified in IEEE Std 802.16-2009 and IEEE 802.16m standards and some transparent optimizations may be made that are outside the scope of this proposal.

The above process/procedure is further applicable to the 3GPP LTE-Advanced technology.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a mobile station (MS), the apparatus comprising a memory and processing circuitry configured to:
   scan base stations that are candidates for MS selection through radio frequency (RF) signal strength measurement and select a first base station of the base stations;
   decode a cell identity associated with the first base station to determine a base station type;
   determine whether the first base station is a closed subscriber group (CSG) base station and whether the first base station is a member based on the cell identity;
   decode a base station identity associated with the first base station;
   determine whether the MS has sufficient access permissions to access the first base station by a determination of whether the base station identity is listed in a CSG whitelist;
   further scan the base stations through RF signal strength measurements in response to a determination that the base station identity is not listed in the CSG whitelist; and
   access the first base station in response to a determination that the base station identity is listed on the CSG whitelist.

2. The apparatus of claim 1, wherein the processing circuitry and memory are further configured to:
   identify a second base station of the base stations is a CSG base station;

determine the CSG base station is a member base station of the MS based on a CSG identity of the CSG base station in the CSG whitelist; and access the second base station.

3. The apparatus of claim 1, wherein the processing circuitry is further configured to:

prior to selection of the first base station of the network, scan Radio Frequency (RF) channels; and in response to a determination that the first base station is a suitable base station, select the first base station.

4. The apparatus of claim 1, wherein the network is a public land mobile network (PLMN) associated with an operator.

5. The apparatus of claim 1, wherein the broadcasted information is from a System Information Block one (1).

6. The apparatus of claim 1, wherein the processing circuitry is further configured to tune to a control channel of the second base station.

7. The apparatus of claim 1, wherein a CSG base station operates at a lower power level than a non-CSG base station and the CSG base station includes a smaller communication range than the non-CSG base station.

8. The apparatus of claim 1, wherein the CSG whitelist is stored in the memory.

9. A non-transitory machine-readable storage device including instructions stored thereon that, when executed by processing circuitry, configure the processing circuitry to:

scan base stations that are candidates for MS selection through a radio frequency (RF) signal strength measurement and select a first base station of the base stations;

decode a cell identity associated with the first base station of the base stations to determine a base station type;

determine whether the first base station is a closed subscriber group (CSG) base station and whether the first base station is a member based on the cell identity;

determine whether the MS has access permissions to access the first base station by a determination of whether the base station identity is listed in a CSG whitelist;

in response to a determination that the base station identity is not listed in the CSG whitelist, further scan the base stations through RF signal strength measurements; and access the first base station in response to a determination that the base station identity is listed on the CSG whitelist.

10. The non-transitory machine-readable storage device of claim 9, further comprising instructions stored thereon that, when executed by the processing circuitry, further configure the processing circuitry to:

perform one or more measurements on a signal received from the first base station to determine whether the first base station is a suitable base station; and in response to a determination that the first base station is a suitable base station, decode broadcasted information.

11. An apparatus of a mobile station (MS), the apparatus comprising a memory, transceiver circuitry, and processing circuitry configured to:

decode a cell identity of a first base station;

determine whether the first base station is a closed subscriber group (CSG) base station and whether the MS is a member based on the cell identity;

decode a base station identity associated with the first base station of the base stations;

determine whether the MS has access permissions to access the first base station by a determination of whether the base station identity is listed in a CSG whitelist;

further scan the base stations through RF signal strength measurements in response to a determination that the base station identity is not listed in the CSG whitelist; and select and associate with the first base station in response to a determination that the base station identity is listed in the CSG whitelist.

12. The apparatus of claim 11, wherein the processing circuitry and memory are further configured to:

identify a second base station is a CSG base station;

determine the CSG base station is a member base station of the MS based on a CSG identity of the CSG base station in the CSG whitelist; and access the second base station.

* * * * *